June 6, 1933.   C. STANSBURY   1,912,411
CONTROLLER FOR DYNAMO-ELECTRIC MACHINES
Filed Oct. 5, 1931
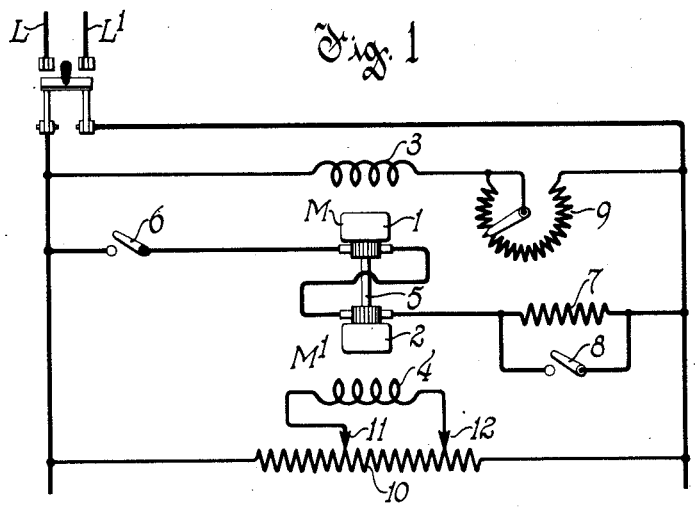
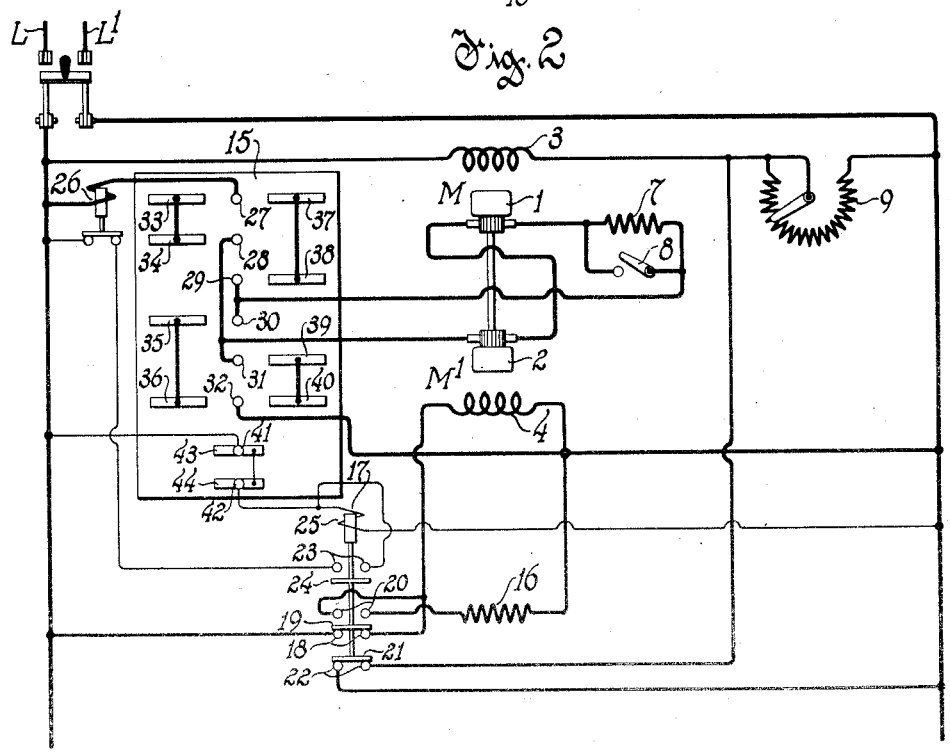
Inventor
Carroll Stansbury
By Frank H. Hubbard
Attorney Patented June 6, 1933

1,912,411

UNITED STATES PATENT OFFICE

CARROLL STANSBURY, OF WAUWATOSA, WISCONSIN, ASSIGNOR TO CUTLER-HAMMER, INC., OF MILWAUKEE, WISCONSIN, A CORPORATION OF DELAWARE

CONTROLLER FOR DYNAMO-ELECTRIC MACHINES

Application filed October 5, 1931. Serial No. 566,918.

This invention relates to controllers for dynamo electric machines, and more particularly to control of direct current motors for speed regulation thereof.

The ordinary direct current motor with shunt or compound field usually has a maximum economic variation of speed by shunt field of four to one, although in some cases this has been increased to six to one. On the other hand, a much wider speed range is frequently desired, and the present invention has among its objects to provide in a practical and economical manner for a materially increased speed range for D. C. motors of conventional form.

A further object is to provide a system of control which may be advantageously employed for pipe coupling screw-on machines or the like.

A further object is to provide a system of control requiring only simple switching means and affording smooth slowdown.

Other objects and advantages of the invention will hereinafter appear.

According to the present invention it is proposed to use two D. C. motors coupled together and to control the shunt fields of both in the manner hereinafter set forth to afford a wide speed range. Also it is proposed to have the armatures of such motors permanently connected in series and to afford control whereby a minimum of current commutation is required and whereby excessive armature current peaks are prevented by the inherent smoothing effect introduced by the inductance of the field of the second motor.

Certain embodiments of the invention are illustrated in the accompanying drawing, wherein Figure 1 shows a simplified control system, while Fig. 2 shows a modified and in some respects more complete system.

Referring to Fig. 1, the same illustrates two motors M and $M^1$ respectively provided with armatures 1 and 2 and shunt field windings 3 and 4, said armatures being mechanically coupled as by shaft 5. The armatures 1 and 2 are permanently connected in series, the same being adapted to be connected across lines L and $L^1$ by a suitable main switch 6, it being understood that the motors may be provided with suitable starting means, as for example resistance 7 and control switch 8. The field winding 3 of motor M is connected across lines L and $L^1$ through a rheostat 9 while field winding 4 of motor $M^1$ is supplied with current from a potentiometer 10. The potentiometer 10 comprises a resistance connected across lines L and $L^1$ and provided with adjustable brushes 11 and 12. The potentiometer 10 affords control whereby the field strength of motor $M^1$ may be adjusted for any value between maximum strength in one direction to zero, as by adjustment of brush 11, or may be given a certain amount of excitation in the opposite direction, as by adjustment of brush 12.

For minimum speed, rheostat 9 is adjusted for full strength of the field 3 of motor M while the brush 11 of potentiometer 10 is adjusted to its extreme left hand position to provide for full field strength of the field 4 of motor $M^1$. For increased speed both fields are weakened, preferably simultaneously, until both motors are at nominal minimum field excitation condition. Still higher speeds are obtainable by a further weakening of field 4, it being possible to adjust the potentiometer as heretofore set forth to give the field 4 excitation in a reverse direction.

This general type of drive is most preferred in cases where there is a definite load cycle to be carried out including high speed operation at light torque and very much lower speed operation at heavy torque, as for example in the case of a machine for screwing couplings on pipes.

Fig. 2 shows a controller suited to such a machine. This figure shows all elements of Fig. 1 with the exception of the potentiometer 10 and main switch 6 and like numerals are used to designate the elements taken from Fig. 1. In this embodiment of the invention the circuit of the motor armatures is controlled by a contact drum 15 and the field winding 4 of motor $M^1$ has associated therewith a resistance 16, said field winding and resistance being under the control of an electroresponsive switch 17. The switch 17 has contacts 18 to be bridged by a contact 19 to connect the field winding 4 directly across lines L and L¹ and with contacts 20 to be bridged by contact 19 to connect the field 4 in a closed loop including the resistance 16, the field under such conditions being disconnected from line L. Also the switch 17 has contacts 22 to be bridged by contact 21 to short-circuit the rheostat 9 in series with the field winding 3 of motor M and with contacts 23 to be bridged by contact 24 for establishing a maintaining circuit for the operating winding 25 of said switch. When the switch 17 is deenergized it bridges its contacts 18 and 22 and when energized it bridges its contacts 23 and 20, the bridging of contacts 23 completing a circuit extending from line L¹ through the down contacts of an electroresponsive relay 26.

The contact drum 15 has contact fingers 27 to 32 and cooperating contact segments hereinafter specified which provide for completion of circuit through the armatures of motors M and M¹, and for reversal of the direction of flow of current in said circuit, this circuit including also the winding of relay 26. More particularly when the contact drum is moved in one direction contact fingers 27 and 28 are respectively engaged by interconnected contact segments 33 and 34 to complete circuit from line L through the winding of relay 26 to the left hand terminal of armature 2 of motor M¹, while contact fingers 30 and 32 are engaged by interconnected contact segments 35 and 36 to connect the right hand terminal of armature 1 of motor M through resistance 7 to line L¹. On the other hand, when the contact drum is moved in the reverse direction contact fingers 27 and 29 are respectively engaged by interconnected contact segments 37 and 38 to connect the right hand terminal of the armature of motor M through resistance 7 and through the winding of relay 26 to line L, while contact fingers 31 and 32 are respectively engaged by interconnected segments 39 and 40 to connect the left hand terminal of the armature of motor M¹ to line L¹ for reverse flow of current. Further the contact drum has contact fingers 41 and 42 which in the off position of said drum are respectively engaged by interconnected contact segments 43 and 44 to connect the winding 25 of switch 17 across lines L and L¹. This provides for energization of switch 17 in the off position of the drum and said switch in responding establishes a shunt around contacts 41 and 42 of the drum which may be traced from line L through the contacts of relay 26 through contacts 23 and 24 of switch 17 to the upper terminal of the winding 25.

Thus when the contact drum is operated to complete circuit for the armatures of the two motors the switch 17 will occupy a position interrupting the short-circuit around the rheostat 9 and connecting the field of motor M¹ in a closed loop including resistance 16, the connections between said field and line L being interrupted. This provides for a high speed regulated by the setting of rheostat 9, the motor M¹ providing neither appreciable torque nor countervoltage. The motor M is thus rendered effective for fast operation of the screw-on machine and when the threads begin to bind the increased current flowing to the motor armature tends to cause response of relay 26.

When relay 26 responds it deenergizes switch 17 with the result of short-circuiting the rheostat 9 and connecting the field of motor M¹ across the line. This in turn strengthens the fields of both motors, slowing them down and increasing the torque for the final screwing on operation.

In practice it may be desirable to employ in the field circuits fluttering relays of a well known type to prevent too sudden changes in the field strength and to provide full field for starting, but as such relays are common expedients they have not been illustrated.

What I claim as new and desire to secure by Letters Patent is:

1. In combination, a D. C. motor, a second D. C. motor mechanically coupled thereto and permanently connected in series therewith, each of said motors having a shunt field, manually operable means to weaken the shunt field strength of the first motor and to disconnect and shunt the field of the second motor for high speed, and means operable automatically in response to a given value of motor current to strengthen the field of the first motor and to connect the field of the second motor to the line for reduced speed and increased torque.

2. In combination, a D. C. motor, a second D. C. motor mechanically coupled thereto and permanently connected in series therewith, each of said motors having a shunt field, and control means for the fields of both motors including an electroresponsive switch, said means in one position of said switch effecting field weakening of the first motor and disconnection and shunting of the field of the second motor for high speed and said means upon operation of said switch to another position effecting field strengthening of the first motor and excitation of the field of the second motor for reduced speed and increased torque.

3. In combination, a D. C. motor, a second D. C. motor mechanically coupled thereto and permanently connected in series therewith, each of said motors having a shunt field, a relay having an operating winding in series with said motors, and control means for the fields of both motors including an electroresponsive switch under the control of said relay, said means in one position of said switch effecting field weakening of the first motor and disconnection and shunting of the field of the second motor for high speed and said means upon operation of said switch in response to operation of said relay effecting field strengthening of the first motor and excitation of the field of the second motor for reduced speed and increased torque.

4. In combination, a D. C. motor, a second D. C. motor mechanically coupled thereto and permanently connected in series therewith, each of said motors having a shunt field, means including an adjustable rheostat in circuit with the shunt field of said first mentioned motor to enable preselection at will of the degree of energization thereof, control means for the fields of both motors including an electroresponsive switch, said means in one position of said switch effecting field weakening of the first motor as predetermined by the adjustment of said rheostat and disconnection and shunting of the field of the second motor for high speed, and said means upon operation of said switch to another position being adapted to short circuit said rheostat to afford full field strength of the first motor and to effect field excitation of the second motor for reduced speed and increased torque.

5. In combination, a D. C. motor, a second D. C. motor mechanically coupled thereto, said motors having the armatures thereof permanently connected in series with each other, each of said motors having a shunt field, means including an adjustable rheostat in circuit with the shunt field of said first mentioned motor to enable preselection at will of the degree of energization thereof, control means for both motors including an electroresponsive switch, said control means in one position of said switch effecting field weakening of the first motor as predetermined by the adjustment of said rheostat and disconnection and shunting of the field of the second motor for high speed, and said control means upon operation of said switch to another position being adapted to short circuit said rheostat to afford full field strength of the first motor and to effect full field excitation of the second motor for reduced speed and increased torque, said control means being also operable at will to effect reversal of the direction of current flow through said motor armatures.

6. In combination, a D. C. motor, a second D. C. motor mechanically coupled thereto and permanently connected in series therewith, each of said motors having a shunt field, means including an adjustable rheostat in circuit with the shunt field of said first mentioned motor to enable preselection at will of the degree of energization thereof, control means for the fields of both motors including a jamming relay having an operating winding in series with said motors and an electroresponsive switch under the control of said relay, said control means in one position of said switch effecting field weakening of the first motor as predetermined by the adjustment of said rheostat and disconnection and shunting of the field of the second motor for high speed, and said control means upon operation of said switch in response to operation of said relay being adapted to short circuit said rheostat to afford full field strength of the first motor and to effect field excitation of the second motor for reduced speed and increased torque.

7. In combination, a D. C. motor, a second D. C. motor mechanically coupled thereto, said motors having the armatures thereof permanently connected in series with each other, each of said motors having a shunt field, means including an adjustable rheostat in circuit with the shunt field of said first mentioned motor to enable preselection at will of the degree of energization thereof, control means for both motors including a jamming relay having an operating winding in series with the motor armatures and an electroresponsive switch under the control of said relay, said control means in one position of said switch effecting field weakening of the first motor as predetermined by the adjustment of said rheostat and disconnection and shunting of the field of the second motor for high speed, and said control means upon operation of said switch in response to operation of said relay being adapted to short circuit said rheostat to afford full field strength of the first motor and to effect full field excitation of the second motor for reduced speed and increased torque, said control means being also operable at will to effect reversal of the direction of current flow through said motor armatures.

In witness whereof, I have hereunto subscribed my name.

CARROLL STANSBURY.